US010648952B2

(12) United States Patent
Cox et al.

(10) Patent No.: US 10,648,952 B2
(45) Date of Patent: May 12, 2020

(54) METHOD AND APPARATUS FOR NON-DESTRUCTIVE MEASUREMENT OF MODULUS OF ELASTICITY AND/OR THE COMPRESSIVE STRENGTH OF MASONRY SAMPLES

(71) Applicant: British Columbia Institute of Technology, Burnaby (CA)

(72) Inventors: Neil Cox, Burnaby (CA); James Booth, Burnaby (CA); Svetlana Brzev, Burnaby (CA); Diane Kennedy, Burnaby (CA); Bill McEwen, Burnaby (CA)

(73) Assignee: Sound QA Solutions Inc., Burnaby (CA)

( * ) Notice: Subject to any disclaimer, the term of this patent is extended or adjusted under 35 U.S.C. 154(b) by 84 days.

(21) Appl. No.: 16/068,233

(22) PCT Filed: Jan. 18, 2017

(86) PCT No.: PCT/CA2017/050058
§ 371 (c)(1),
(2) Date: Jul. 5, 2018

(87) PCT Pub. No.: WO2017/124188
PCT Pub. Date: Jul. 27, 2017

(65) Prior Publication Data
US 2019/0011405 A1    Jan. 10, 2019

Related U.S. Application Data

(60) Provisional application No. 62/279,934, filed on Jan. 18, 2016.

(51) Int. Cl.
*G01N 29/04*    (2006.01)
*G01N 29/11*    (2006.01)
(Continued)

(52) U.S. Cl.
CPC ............ *G01N 29/46* (2013.01); *G01N 29/045* (2013.01); *G01N 29/11* (2013.01);
(Continued)

(58) Field of Classification Search
CPC ...... G01N 29/045; G01N 29/11; G01N 29/46; G01N 29/4436; G01N 3/30; G01N 2291/2698; G01N 2291/02827
(Continued)

(56) References Cited

U.S. PATENT DOCUMENTS 5,741,971 A * 4/1998 Lacy .................... E21B 47/0005
73/152.16
5,841,019 A   11/1998 Drabrin et al.
(Continued)

FOREIGN PATENT DOCUMENTS

DE    4116471    11/1992
EP    1780539    5/2007
(Continued)

OTHER PUBLICATIONS

Roebben G et al: "Impulse Excitation Apparatus to Measure Resonant Frequencies, Elastic Moduli, and Internal Friction at Room and High Temperature" Review of Scientific Instruments, AIP, Melville, NY, US, vol. 68 No. 12, Dec. 1, 1997, pp. 4511-4515, XP000726321, ISSN: 0034-6748, DOI: 10.1063/1.1148422, *p. 4511-p. 4513*.

*Primary Examiner* — Jacques M Saint Surin
(74) *Attorney, Agent, or Firm* — Ryan W. Dupuis; Ade & Company Inc.; Kyle R. Satterthwaite

(57) ABSTRACT

A method and apparatus for determining the compressive strength of masonry units based on airborne sonic signals generated by stimulating the samples with short duration, mechanical impulses are described. The non-destructive testing apparatus consists of a specimen support unit which mechanically isolates the masonry unit from the environ-
(Continued)

ment and from the support, a mechanical stimulator, and an acoustic response detector. The signals recorded are analyzed to extract the pertinent features which are then used to compute the compressive strength of the sample. The pertinent signals are deduced through a calibration of the masonry type being analyzed (material and shape) based on physical analysis of the sample's normal modes of vibration, or through Finite Element Analysis of the vibrations, or through direct empirical calibration. This non-destructive testing method is low-cost, readily implemented and provides a reliable technique for compressive strength estimation.

17 Claims, 5 Drawing Sheets

(51) Int. Cl.
  *G01N 29/44* (2006.01)
  *G01N 29/46* (2006.01)
  *G01N 3/30* (2006.01)

(52) U.S. Cl.
  CPC .......... *G01N 29/4436* (2013.01); *G01N 3/30* (2013.01); *G01N 2291/02827* (2013.01); *G01N 2291/2698* (2013.01)

(58) Field of Classification Search
  USPC .......................................................... 73/573
  See application file for complete search history.

(56) References Cited

U.S. PATENT DOCUMENTS

| | | | | |
|---|---|---|---|---|
| 6,092,421 | A * | 7/2000 | Bar-Cohen | G01N 29/041 |
| | | | | 73/621 |
| 6,880,386 | B1 * | 4/2005 | Krotil | B82Y 35/00 |
| | | | | 73/105 |
| 6,941,819 | B1 * | 9/2005 | Maki, Jr. | G01N 29/07 |
| | | | | 73/788 |
| 7,305,884 | B1 * | 12/2007 | Schueneman | G01N 29/0645 |
| | | | | 73/593 |
| 9,696,282 | B2 * | 7/2017 | Chatellier | G01N 29/07 |
| 2007/0157698 | A1 | 7/2007 | Allaire et al. | |
| 2010/0162153 | A1 * | 6/2010 | Lau | G06F 3/0488 |
| | | | | 715/769 |
| 2013/0174666 | A1 * | 7/2013 | Hadj Henni | G01N 11/16 |
| | | | | 73/800 |
| 2016/0110880 | A1 | 4/2016 | Keat et al. | |

FOREIGN PATENT DOCUMENTS

| | | |
|---|---|---|
| WO | 2010150109 | 12/2010 |
| WO | 2011132024 | 10/2011 |

* cited by examiner (A) Longitudinal Mode  (B) Torsional Mode  (C) Transverse Mode

METHOD AND APPARATUS FOR NON-DESTRUCTIVE MEASUREMENT OF MODULUS OF ELASTICITY AND/OR THE COMPRESSIVE STRENGTH OF MASONRY SAMPLES

This application claims priority of U.S. provisional application Ser. No. 62/279,934, filed Jan. 18, 2016.

FIELD OF THE INVENTION

The present invention relates to non-destructive testing (NDT) of Masonry samples for the purpose of deriving measures of the modulus of elasticity and/or the compressive strength of the samples.

BACKGROUND

Compressive strength and modulus of elasticity are recognized as important measurements for quality control in masonry. The non-destructive aspect of NDTs allows for testing of more samples more frequently because the sample is not sacrificed. Moreover, standard destructive test methods are time consuming and require large expensive testing apparatus that is not ubiquitously available. In some places this has led to a disturbing lack of testing and construction of dangerously weak buildings. In this circumstance, development and adoption of reliable, inexpensive NDTs can help to protect public safety and prevent much damage and mortality in the event of an earthquake. Even in countries where testing is better, the availability of reliable inexpensive NDTs can complement and improve existing testing programs.

A number of NDTs have been described in the literature such as M. Forde, "ACI 228.2R-13 Report on Nondestructive Test Methods for Evaluation of Concrete in Structures," American Concrete Institute, 2013. However, there appears to be no mention of use of sonic signals for measurement of concrete strength. Qualitative assessment in the course of inspection of a specimen may involve tapping the specimen, but such assessment is directed primarily towards detection of localized structural inconsistencies, and no systematic analysis of the "sound" of the tap is applied. There is recognized methodology for systematic analysis of the response to a tap but again this is directed towards characterization of structural inconsistencies. Most of these methods rely on accelerometers that are affixed to the object being tested. There is a description that considers the possibility of picking up the airborne sonic signal using a microphone for assessment of localized structural inconsistencies in I. Hertlin and D. Schultze, "Acoustic Resonance Testing: the upcoming volume-oriented NDT method," in *International Conference for non-destructive testing*, Rio de Janeiro, Brazil, 2003, but no mention is made of strength measurement in this paper.

A method that shares some similarities with our methodology is found in ASTM, "C215-02: Standard Test Method for Fundamental, Longitudinal and Torsional Resonance Frequencies of Concrete Specimens," ASTM International, 2002, wherein a method is described for measuring the transverse, longitudinal and torsional resonant frequencies of concrete specimens. One variant of this method involves striking the specimen with a hammer and analysing a signal that is picked up by an accelerometer attached to the sample. The data can be used to estimate the dynamic modulus of elasticity, dynamic modulus of rigidity and dynamic Poisson's ratio from the resonant frequencies, mass and dimensions of the sample. However, no mention is made of measuring the compressive strength of the sample, and no mention is made of using an airborne sonic signal in the analysis.

There are several patents related to ultrasonic testing, such as:

U.S. Pat. No. 7,587,943, H. Wiggenhauser and A. Samokrutov, "Device for the destruction-free testing of components";

U.S. Pat. No. 7,587,943, 15 Sep. 2009;

U.S. Pat. No. 7,677,104 B2, V. E. Maki and J. J. Moon Jr, "Acoustic Transducer System for Non-Destructive Testing of Cement";

U.S. Pat. No. 7,677,104 B2, 16 Mar. 2010;

UK1279865 J. Vainshtok, N. Mizrokhi and I. I. Silkin, "Improvements in and relating to Ultrasonic Testing Apparatus";

United Kingdom Patent 1,279,865, 28 Jun. 1972, UK1262343, A Transducer for the testing of materials by use of ultra-sonic vibrations";

United Kingdom Patent 1,262,343, 2 Feb. 1972;

DE19629485, R. Krompholz, B. Kaesner, J. Oecknick and G. Gebauer, "Ultrasonic measurement of concretre compressive strength to determine time for demoulding setting concrete"; and Europe Patent 19,629,485, 22 Jan. 1998.

The methods, apparatus and objectives of these above noted patents differ significantly from ours.

Patents related to strength testing of concrete slurry or curing concrete, such as: (i) U.S. Pat. No. 6,112,599, V. Maki Jr, "Method and Apparatus for Measuring a Cement Sample using a Single Transducer Assembly"; (ii) U.S. Pat. No. 6,112,599, 5 Sep. 2000; (iii) U.S. Pat. No. 6,510,743, R. G. McAfee and R. E. Carpenter Jr, "Reuseable in-situ concrete Test specimen apparatus and method"; (iv) U.S. Pat. No. 6,510,743, 28 Jan. 2003; (v) US2007/0046479 A1, J. H. Hines, "Concrete Maturity Monitoring System using Passive Wireless Surface Acoustic Wave Temperature Sensors"; and (vi) United States Patent 2007/0046479 A1, 1 Mar. 2007, are also quite different from ours, as are methods for detecting imbedded defects in concrete structures, such as (i) U.S. Pat. No. 4,896,303, D. Leslie, J. A. E. De Selliers de Moranville and D. J. Pittman, "Method for Cementation Evaluation using Acoustical Coupling and Attenuation"; (ii) U.S. Pat. No. 4,896,303, 23 Jan. 1990 (iii) U.S. Pat. No. 4,748,855, R. M. Barnoff, "Device for in-situ testing of concrete"; and (vi) U.S. Pat. No. 4,748,855, 7 Jun. 1988.

U.S. Pat. No. 4,342,229 describes an invention for measuring degradation of the structural integrity of objects that may be susceptible to small structural defects or fatigue failures. While an acoustic impulse response method is described and signals may be recorded using either accelerometers or microphones, their method relies on comparing the rate of decay of the impulse response with reference values for such decay. This analysis is significantly different from the present invention, and no mention is made of measuring compressive strength.

U.S. Pat. No. 5,285,687 describes and invention that employs acoustic testing for damage of monolithic carrier elements of porous ceramic material for use in manufacturing of waste gas catalysts. While the methods involve acoustic impulse responses, the application, the apparatus and the analysis methods are fundamentally different and compressive strength is not mentioned.

Finally, U.S. Pat. No. 6,990,845, W. S. Voon, R. U. Spjado, A. M. S. Hamouda, M. M. H. Ahmad and T. K. Sheng, "Pendum Impact Test Rig", Jan. 31, 2006 describes a pendulum-based tester where the impulse response of the sample under test is analysed. However, this is primarily described for simulation of crash conditions on individual automotive components. The component under test is typically damaged or destroyed in the envisaged application, and no mention is made of non-destructive testing of concrete.

There appears to be no patents directed at non-destructive measurement of compressive strength of concrete samples. The systematic use of airborne sonic signal for this type of testing also appears to be unexplored. Even with methods that use accelerometers the connection to compressive strength has not been identified.

SUMMARY OF THE INVENTION

According to a first aspect of the invention there is provided an apparatus for non-destructive measurement of a masonry specimen having prescribed physical attributes, the apparatus comprising:

a stimulator arranged to apply a non-destructive stimulus to the specimen that will elicit an acoustic response;

a response sensor arranged to capture sonic signals from the acoustic response to said non-destructive stimulus and generate a response signal that is representative of the captured sonic signals;

a signal processor operatively associated with the response sensor for receiving the response signal from the response sensor and being arranged to execute programming instructions stored thereon so as to:

analyse the response signal and quantify pertinent features of the response signal, and calculate a compressive strength of the specimen based upon said prescribed physical attributes and the pertinent features quantified by the signal processor.

According to a second aspect of the present invention there is provided an apparatus for non-destructive measurement of a masonry specimen having prescribed physical attributes, the apparatus comprising:

a stimulator arranged to apply a non-destructive stimulus to the specimen that will elicit an acoustic response;

a response sensor comprising a transducer which is arranged to capture airborne sonic signals in the audible frequency range from the acoustic response to said non-destructive stimulus and generate a response that is representative of the captured airborne sonic signals;

a signal processor operatively associated with the response sensor for receiving the response signal from the response sensor and being arranged to execute programming instructions stored thereon so as to:

analyse the response signal and quantify pertinent features of the response signal, and calculate a material property of the specimen based upon said prescribed physical attributes and the pertinent features quantified by the signal processor.

In one embodiment, the material property calculated by the signal processor is a dynamic modulus of elasticity.

Preferably the signal processor quantifies the pertinent features of the response signal according to one or more prescribed vibrational modes. In this instance, the apparatus further comprises a specimen support arranged to support the specimen thereon so as to reduce interference with said one or more vibrational modes.

The specimen support may be arranged to support the specimen on a respective surface of the specimen support that does not unduly vibrate sympathetically with the specimen when the specimen is stimulated by the stimulator.

The stimulator may include a striking element which is arranged to vibrate in response to the non-destructive stimulus to the specimen in a manner which can readily be distinguished from vibrations of said specimen itself.

The striking element is preferably supported so as to rebound in a substantially unrestricted manner from the specimen responsive to said non-destructive stimulus to the specimen.

The stimulator may be arranged to elicit an acoustic response which is dominant in one mode of vibration. In this instance, the quantified pertinent features correspond to the dominant mode of vibration.

The response sensor may comprise a transducer arranged to be affixed to said specimen and which is arranged to generate the response signal responsive to vibrations of said specimen in the audible frequency range.

Alternatively, the response sensor may comprise a transducer which is arranged to generate the response signal responsive to airborne sonic signals in the audible frequency range.

The signal processor may be further arranged to: (i) execute a spectrum analysis on the response signal followed by a derivation of attributes of one or more vibrational modes in the response signal, (ii) execute a Wavelet analysis on the response signal followed by a derivation of attributes of any dominant Wavelets in the response signal, (iii) compensate for interfering effects of said apparatus on said response signal resulting from supporting elements which support the specimen or coincidental vibrations of a striker element of the stimulator, (iv) compare the response signal to validation criteria and determine if the response signal is consistent with a valid test, and (v) any or all of the above in combination.

The pertinent features quantified by the signal processor may include quantifications of selected time-domain attributes of the response signal, for example magnitudes and/or durations of said response signal.

The pertinent features quantified by the signal processor may also include quantifications of selected properties of computed frequency spectra of the response signal, for example in which the selected properties are estimates of the frequency or bandwidth of one or more resonant peaks in said frequency spectrum.

According to another aspect of the present invention there is provided a method for non-destructively measuring the dynamic modulus of elasticity and/or the compressive strength of a specimen having prescribed physical attributes, comprising:

applying a non-destructive stimulus to said specimen to elicit an acoustic response;

generating a response signal that is representative of the acoustic response to said stimulus by capturing sonic signals;

analysing the generated response signal to quantify pertinent features of the response signal; and calculating a material property of the specimen based upon the prescribed physical attributes of the specimen and the quantified pertinent features of the response signal in which the material property is the dynamic modulus of elasticity and/or the compressive strength of said specimen.

Preferably, the material property is the dynamic modulus of elasticity or the compressive strength of said specimen.

The response signal is preferably generated by capturing airborne sonic signals.

The method may include supporting the specimen so as to reduce interference with vibrational modes of the specimen that are used in calculating said material property of the specimen, and/or supporting the specimen on a supporting structure that does not unduly vibrate sympathetically when the specimen is stimulated.

Preferably the specimen is stimulated using a striking element such that vibrations of said striking element can be distinguished from vibrations of the specimen itself by the signal processor.

The striking location may be selected such that (i) the acoustic response is dominant in one mode of vibration so that the pertinent features correspond to the dominant mode of vibration, or alternatively, (ii) the acoustic response is pronounced in more than one mode of vibration so that the pertinent features correspond to said more than one dominant mode of vibration.

The response signal may be analysed by (i) using spectrum analysis followed by a derivation of attributes of vibrational modes in the signal, (ii) using Wavelet analysis followed by a derivation of attributes of dominant Wavelets in the signal, (iii) compensating for interfering effects of the apparatus on the captured sonic signals, (iv) compensating to reduce an unwanted influence of a specimen supporting structure which supports the specimen, (v) compensating to reduce an unwanted effect of coincidental vibrations a striking element used for applying the stimulus to the specimen, (vi) compensating for deviations from expected physical properties of the specimen which can be detected in said acoustic response, and (vii) any or all of the above in combination.

The analysis of the response signal may include comparison of properties of the acoustic response to validation criteria to determine whether said acoustic response is consistent with a properly performed test or said acoustic response is flawed. In this instance, the method may include notifying an operator when said acoustic response is determined to be flawed, and/or rating the validity of the acoustic response and notifying an operator of the rating together with the calculated material property of the specimen.

The pertinent features of the response signal may be quantified by quantifying selected time-domain attributes of the response signal, for example the magnitudes and/or durations of the response signal.

The pertinent features of the response signal may also be quantified by quantifying selected properties of computed frequency spectra of the response signal, for example estimates of a frequency of one or more resonant peaks in said frequency spectrum, or estimates of a bandwidth of one or more resonant peaks in said frequency spectrum.

The prescribed physical attributes of the specimen may be quantified by measuring size and shape properties which affect said pertinent features, or by identifying a standard size and shape that is descriptive of the specimen.

Calculating the material property of the specimen may be done by applying mathematical functions of said pertinent features and measures of size and shape properties which affect said pertinent features, or by applying a mathematical function of said pertinent features selected from a set of such mathematical functions based on indicators which identify the standard size and shape that is descriptive of the specimen being tested.

When the masonry specimen is mounted within a surrounding supporting structure, the method preferably includes incorporating a gradient of influence representing the surrounding supporting structure into the analysis of the response signal and into the calculation of said material property of the specimen.

More particularly, when the masonry specimen comprises a masonry unit supported within a surrounding supporting structure formed of a plurality of other masonry units connected to one another with mortar, the method including incorporating a boundary condition representative of the mortar about the masonry specimen into the analysis of the response signal and into the calculation of said material property of the specimen.

The present invention provides a method and apparatus for determining the compressive strength of masonry units based on the properties of air-borne acoustic signals produced by a short duration, mechanical impulse stimulating the test sample. This method and apparatus has successfully been demonstrated on both concrete cylinders and for concrete blocks, and can also be used for other masonry elements. The cylinder analysis related the compressive strength to the acoustic velocity of both longitudinal and torsional acoustic speeds, v=2Lf, where f is the measured frequency. The method was applied to 64 cylinder samples ranging in compressive strength from 3 MPa to 30 MPa, and it was demonstrated that the compressive strength closely followed an exponential dependence on the acoustic velocities of the sample. A linearized plot of ln $f_c'$ versus the acoustic velocities had a Pearson r-squared correlation coefficient of 0.95.

This proof of concept was followed up through a study of 2-cell concrete blocks. The shape of these led to richer acoustic spectra generated by the short duration impulses applied to the sample, which varied from strike location to strike location. It was shown that for samples of the same size and shape, the compressive strength also followed an exponential dependence on the resonant frequencies measured at standardized strike locations. This demonstration verified that this procedure for masonry unit strength can be used for a systematic, empirical calibration to reliably determine compressive strength from the resonant vibration frequencies of the test sample.

The approach described is a novel method and apparatus for acoustic, non-destructive compressive strength testing for masonry units. The strengths include a simple test procedure which is low cost and readily implemented, a clear, strong correlation between compressive strength and few measured parameters (shape of the test sample, resonant vibration frequencies, and strike location), and is non-destructive.

BRIEF DESCRIPTION OF THE DRAWINGS

The invention as well as other features and advantages thereof, will be best understood by reference to the description which follows, read in conjunction with the accompanying drawing wherein.

DETAILED DESCRIPTION

Figure 3:
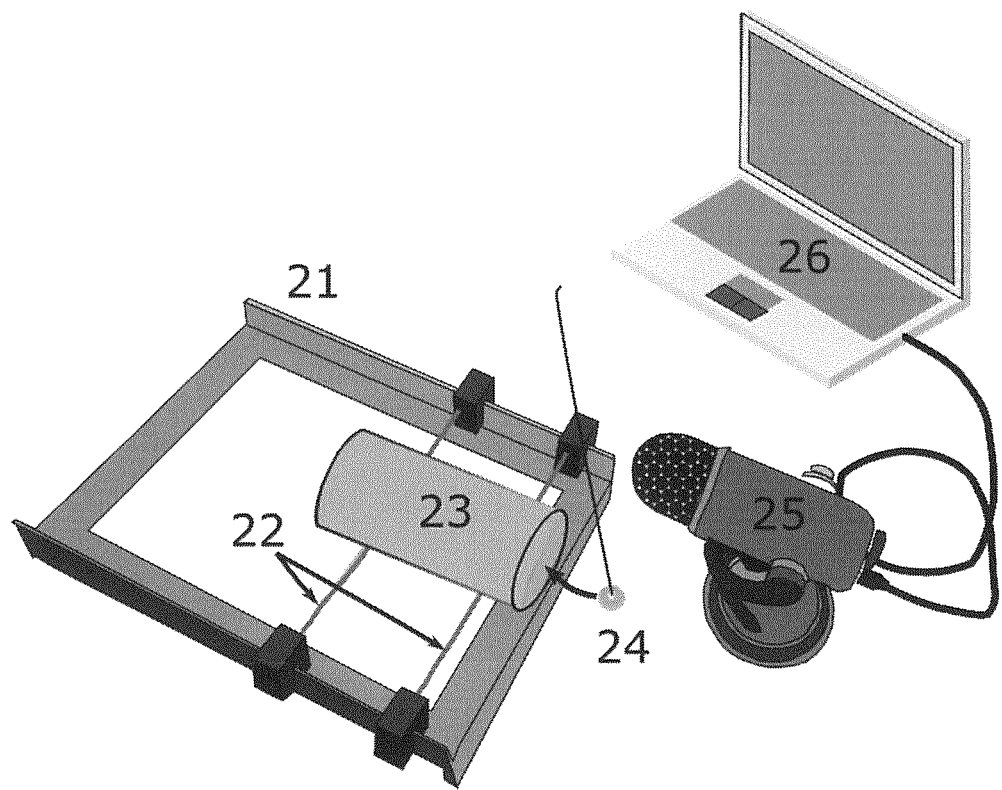
FIG. 3 is the current embodiment of the masonry unit testing apparatus.

Turning initially to FIG. 3, there is shown one illustrative embodiment of an apparatus for non-destructive measurement of the modulus of elasticity and the compressive strength of a masonry specimen. In this instance, a supporting structure is provided for supporting the specimen 23 in the form of a frame 21 having two spaced apart side rails which are parallel to one another and interconnected by two cross bars to define a testing area therebetween. Two support wires 22 span under tension across the testing area between the side rails at opposing sides of the frame such that the wires are parallel and spaced apart from one another in the longitudinal direction of the rails by an adjustable amount determined by the mounting locations of the ends of the wires on the respective rails of the frame.

The specimen 23 which is elongate in a longitudinal direction is supported generally in the testing area of the frame between the two side rails by being supported on the two support wires 22 proximate opposing ends of the specimen. The longitudinal direction of the specimen is thus aligned perpendicularly to the support wires 22 and parallel to the side rails 21 of the frame. The specimen may be provided with already known physical attributes relating to size and shape and material type, or these properties may be determined using a physical property determining tool for measuring dimensions and identifying the material for example.

The apparatus further includes a stimulator having a striking element 24 in the form of a ball bearing suspended from a pendulum cable positioned relative to the supporting structure of the specimen such that the pendulum displaces the striking element generally in the longitudinal direction of the specimen and in the longitudinal direction of the side rails of the frame at the point of impact of the striking element with the specimen. In this manner, the striking element is free to rebound from the specimen after impact in a substantially unrestricted manner to minimize influence of the striking element on the vibrations induced within the specimen. In the illustrated embodiment, the striking element is supported relative to the supporting structure that supports the specimen thereon such that the striking element is arranged to strike the specimen at a location which produces one dominant mode of vibration.

The apparatus further includes a response sensor in the form of a microphone 25, otherwise described herein as an acoustic response acquirer. When presented as a microphone 25, the response sensor is a transducer which is capable of capturing airborne sonic signals and to generate a response signal which is representative of the captured airborne sonic signals which define an acoustic response to the impact of the striking element 24 with the specimen, otherwise referred to herein as a stimulus to elicit an acoustic response.

A signal processor 26 of the apparatus is provided in the form of a computer device having a memory therein and a computer processor arranged to execute programming instructions stored on a memory to perform the various functions of the apparatus as described herein. The computer device further includes a user input to accept instructions from the operator of the apparatus, and a microphone signal input forming a wired connection with the microphone to receive the response signal generated by the microphone at the computer device. The display screen is also provided for displaying results to the operator and for displaying other intermediate data relative to which the operator can make selections. The computer device generally provides the function of an acoustic response signal analyser to quantify pertinent features in the response signal and a specimen strength measurer which derives and/or calculates one or more material properties relating to the specimen based upon determined physical attributes of the specimen and the quantified pertinent features of the response signal. More particularly, the signal processor 26 makes use of an established correlation between compressive strength and acoustic frequency measured from the airborne signal to calculate the compressive strength of the specimen using the quantified pertinent features of the specimen together with the prescribed physical attributes of the specimen.

The general function of the apparatus will now be described in relation to FIG. 1. As shown, a specimen supporter 12 is typically provided upon which the specimen under test 3 is supported. The specimen supporter 12 may be a frame 21 with taut wires 22 as described above, or alternatively may take the form of a supporting surface which does not vibrate sympathetically with the acoustic response to the stimulus applied to the specimen. In yet further embodiments, the specimen may be suspended by cables of the supporting structure. Use of taut wires or suspension cables have the effect of minimizing the interference of vibrations between the sample and the supporting structure.

In yet further embodiments, the specimen supporter 12 may take the form of a surrounding structure within which the specimen is installed. Special accommodations may be required in this instance when calculating the material property of the specimen as described in further detail below.

To initiate a test of a specimen to determine a material property of the specimen, a stimulator 1 is provided having a striking element which momentarily impacts the specimen to elicit an acoustic response in the form of sonic signals. The stimulator 1 may take the form of a pendulum striking element 24 as shown in FIG. 3, or another form of striking element which is accelerated towards the specimen to produce an impact using a suitable spring, also as described herein. In either instance, the striking element is preferably supported relative to the supporting structure that supports the specimen thereon such that the striking element is free to rebound from the specimen subsequent to impact in a substantially unrestricted manner.

Figure 1:
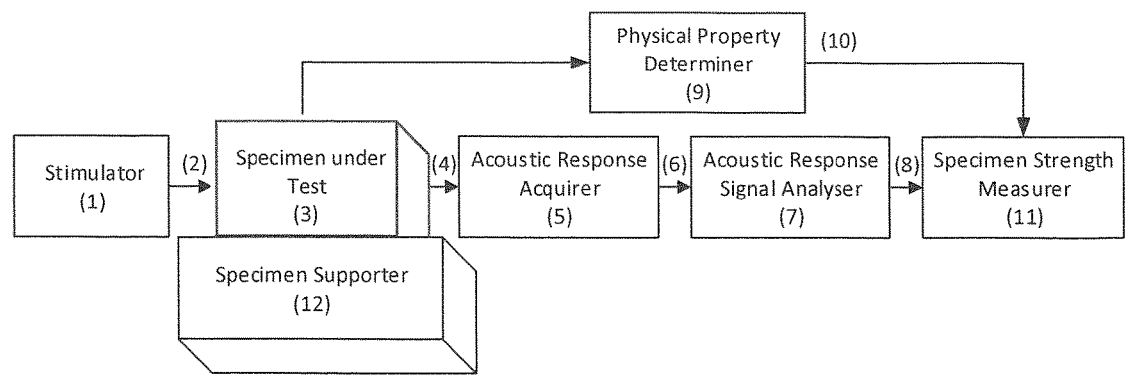
FIG. 1 is a schematic diagram of the masonry testing apparatus illustrating the general functionality of the apparatus.

The apparatus according to FIG. 1 further includes an acoustic response acquirer 5 which captures sonic signals forming the acoustic response to the impact of the stimulator. When the acquirer is a microphone 25 it is capable of capturing airborne sonic signals, however the acquirer 5 may also take the form of any other suitable transducer capable of capturing sonic signals to generate a response signal representative of the captured sonic signals such as an accelerometer coupled in fixed attachment to the specimen.

The response signal 6 generated by the acquirer 5 is transmitted to the acoustic response signal analyser 7 of the signal processor 26. The signal analyser 7 identifies peaks in the response signal 6 and performs other signal analysis as described herein to determine pertinent features 8 in the response signal 6. The signal analyser 7 may identify vibration patterns representative of vibrations of the striking element or vibrations of the supporting structure for supporting the specimen thereon to allow for compensation of these interfering vibrations prior to identifying pertinent features within the remaining response signal 6 which represents vibrations of the acoustic response within the specimen itself.

The specimen strength measurer 11 of the signal processor 26 gathers data from the acoustic response signal analyser in the form of the quantified pertinent features 8 as well as the prescribed physical properties 10 of the specimen which may be known properties input by the operator through the user input of the signal processor 26, or may be measured properties which are determined by the physical property determiner 9. In either instance, the signal processor combines the relevant data and performs suitable calculations using selected formulas as described in further detail below to calculate or derive the dynamic modulus of elasticity and the compressive strength of the specimen being tested.

In summary, the block diagram of FIG. 1 schematically represents the function according to one representative embodiment of the invention for non-destructive measurement of the modulus of elasticity and/or the compressive strength of the Specimen under Test (3). The Specimen under Test (3) may be a masonry brick or block such as are commonly used in building construction worldwide.

The Stimulator (1) applies a non-destructive stimulus (2) to the Specimen under Test (3). The Stimulator (1) is active to precipitate an acoustic response (4) in the Specimen under Test (3). In one embodiment of the invention, the Stimulator (1) comprises a pendulum used to strike the specimen under test. In another embodiment, the Stimulator (1) comprises a spring-loaded striker. A specific embodiment of the spring-loaded striker is a blunt-nosed cylindrical striker weighing a few ounces that is contained along with a spring within a loose-fitting sleeve that is roughly the size of a pen. The spring is compressed in preparation for triggering. When triggered, the cylindrical striker is accelerated initially by the spring. After being accelerated, the striker moves away from the spring and strikes the sample under test through its own momentum. The striker is then free to bounce back without impediment, thereby avoiding interference with the acoustic response of the sample under test. The spring-loaded striker is optimally designed to minimize noise generated from its own vibrations when it is operated. In another embodiment, the stimulator (1) is a hammer. While this embodiment may seem to be the most attractive, the vibration of the hammer after striking the specimen under test (3) creates a sonic signal that can interfere with the sonic signal produced by the block. Additional processing elements are required within the invention to mitigate such interference and, depending on the hammer, it may not be feasible to obtain an accurate result.

The Acoustic Response Acquirer (5) is active to detect the acoustic response (4) and produce one or more acoustic response signals (6) for the analyses that follow. One embodiment of the Acoustic Response Acquirer (5) is an audio microphone active to detect the airborne sonic signal that is created when the stimulus (2) is applied. Another embodiment of the Acoustic Response Acquirer (5) comprises one or more accelerometers strategically positioned on the Specimen under Test (3) and active to detect the block-borne sonic signal that is created when the stimulus (2) is applied. In this embodiment, the accelerometers are positioned so as to pick up a selected mode of vibration of the Specimen under Test (3). This selected mode of vibration may or may not be the mode that is the dominant contributor to the airborne sonic signal.

The Acoustic Response Signal Analyser (7) is active to derive pertinent features (8) from the acoustic response signal (6). One embodiment of the Acoustic Response Signal Analyser (7) involves application of spectrum analysis methods to derive an estimate of the frequency spectrum of the acoustic response signal (6). This is followed by determination of the frequencies of the largest peaks in the frequency spectrum, herein referred to as the dominant resonant peaks or modes. Other features may also be derived from the acoustic response signal (6) such as bandwidths of the resonant modes, temporal attributes, or features derived from Wavelet analysis. The Acoustic Response Signal Analyser (7) is also active to assess whether the properties of the sonic signal, in the aggregate, are consistent with a properly performed test. This typically involves comparison of the signal to defined criteria which establish if the test was properly performed. A validity rating can also be generated by determining how closely the signal matches the defined criteria to assign a level of confidence in the results from the test and/or to request that the user try again. In some cases, it may be possible to identify the likely cause for the flawed signal and either compensate for the flaw or give the user guidance on why a test was rejected. In some cases, this may also be used to identify and compensate for deviations from the expected physical properties of the specimen under test or the conditions of the test.

Additional processing may be included in the Acoustic Response Signal Analyser (7) to compensate for unwanted influence of the Specimen Supporter (12) on the pertinent features (8). Additional processing may also be included in the Acoustic Response Signal Analyser (7) to compensate for unwanted influence of coincidental acoustic signals that emerge from the Stimulator (1).

The Specimen Strength Measurer (11) is active to measure the dynamic modulus of elasticity and compressive strength of the specimen based on the pertinent features (8) and the physical properties (10) of the specimen under test. One embodiment makes use of the selected resonant modes obtained from one or more acoustic responses for which the Stimulator (1) is applied to one or more positions on the specimen under test. These pertinent features are combined mathematically with measures of the size and geometry of the specimen to produce a measure of the compressive strength of the specimen. A variant of this embodiment is to choose a mathematical function for measurement of compressive strength from a set of such mathematical functions based on indicators which identify the standard size and shape that is descriptive of the masonry elements being tested. In this variant of the embodiment, the physical factors are implicitly accounted for within the mathematical functions and thus are not needed as inputs for the mathematical functions.

The design of the Specimen Supporter (12) can affect the accuracy and reliability of the results, and also the complexity of the signal analysis required to derive the results. The specimen should optimally be physically decoupled from the supporting apparatus to minimize coincidental vibrations of the support apparatus and to permit unencumbered (free) vibration of the specimen. This is sometimes referred to as "free-free" in modal analysis literature. Moreover, the acoustic signals resulting from resonance of the support apparatus should be relatively small and/or significantly different than the expected resonant frequencies of the sample under test so that coincidental vibrations of the apparatus can be distinguished from the vibrations of the specimen. For one embodiment of the specimen supporter, the sample is suspended on wires slung below a table-like apparatus. For another embodiment, the specimen may be placed on top of taut support wires or support points attached to a frame such that interference with the main modes of vibration of the specimen is minimized. For yet another embodiment, the sample may be placed on a cushioning material such as foam or air-filled cushion so as to allow the specimen to vibrate independently of surrounding solid material. However, these preferred support conditions aside, the invention can still be applied when the sample is placed on the ground or on a hard surface such as a concrete floor.

In some circumstances, a complete assessment may involve a combination of results from more than one stimulation.

The invention can be used to test a masonry element built into a masonry structure by applying the stimulus and analysing the sonic signal that is produced. The Specimen under Test (3) is the masonry element that receives the stimulus and the Specimen Supporter (12) is implicitly the rest of the structure. While it may not always be possible, the fact that the specimen and the specimen supporter in this case are tightly coupled (typically with mortar) can be addressed by adopting analysis strategies in the Acoustic Response Signal Analyser (7), the Specimen Strength Measurer (11) and the Physical Property Determiner (10) that give consideration to the effect of the tight coupling on the sonic signal. Other aspects of the masonry structure may also need to be accounted for, such as presence of material or reinforcing elements in the voids of the masonry blocks.

The invention can also be included as part of a test regimen for a concrete wall or other structure. The principle is that some aspects of the sound produced by striking the structure during the test will be affected more by the material properties near the point of impact than by material properties that are farther away from the point of impact. The "boundary" between the specimen under test and the specimen supporter no longer exists in this case, rather, it is replaced by a gradient of influence of the material being tested on pertinent acoustic properties. As before, while it may not always be possible, these conditions can be addressed by adopting analysis strategies in the Acoustic Response Signal Analyser (7), the Specimen Strength Measurer (11) and the Physical Property Determiner (10) that give consideration to the circumstances of the test. Other aspects of the wall may also need to be accounted for, such as voids, variation in wall thickness or presence of reinforcing elements.

Principles of Operation and Methodology.

The following description of a specific embodiment of the invention, combined with analytical and experimental results obtained in designing and using such an embodiment, is helpful for understanding of the principles of operation for the invention.

Figure 2:
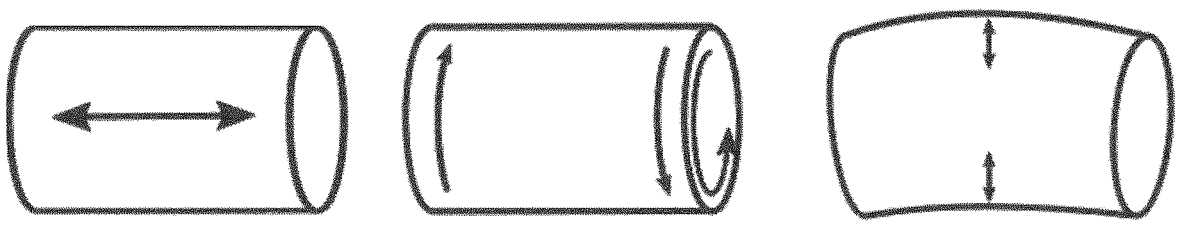
FIG. 2 contains three simple modes of vibration for a cylindrical masonry unit correspond to (A) a longitudinal mode, (B) a torsional mode, and (C) a transverse mode of oscillation.

Example embodiment and validation of the approach using cylinders. It has been established that normal modes of vibration of a masonry unit are closely related to the dominant signal frequencies of the airborne sound signal produced by striking the masonry unit. This relationship has been confirmed through theoretical and experimental results derived for a solid cylinder which is one of the simplest standard shapes used for masonry testing. For a cylinder with length, L, and diameter, D, well-known principles of physics can be used to derive the natural or normal modes of vibration, i.e., the longitudinal mode, a torsional mode, and a transverse mode, as illustrated in FIG. 2.

As shown in [15], The speed of sound of a longitudinal oscillation, $v_{long}$, for a cylinder of material with an elastic modulus, E, and density, ρ, is given as, $$v_{long} = \sqrt{\frac{E}{\rho}} \quad (1)$$

Similarly, the torsional mode velocity is given as $v_{tor} = \sqrt{G/\rho}$, where G is the shear modulus of the material. Since the shear modulus is lower than the elastic modulus, the longitudinal velocity is greater than the torsional mode velocity.

For an isolated cylinder, the resonant longitudinal oscillation will occur when the wavelength of the oscillation, λ, matches the length of the cylinder, L, $$L = \frac{n}{2}\lambda \quad (2)$$

where $n = 1, 2, 3, ...$

Combining this with the relationship between the wavelength, frequency, and wave speed, one obtains:

$$v_{long} = \lambda f = \frac{2}{n} L f \quad (3)$$

Equation (3) provides a method for measuring the speed of the longitudinal normal mode of the waves in masonry cylinders based on the length of the cylinder and a determination of the resonant frequencies of oscillation, f, for each order (n=1, 2, 3 . . . ) of oscillation. For the lowest order mode (n=1), we have $v_{long}=2Lf$.

Note that Equation (3) combined with Equation (1) implies that, given knowledge of the length of the cylinder and the resonant frequency, one can derive the acoustic velocity and gain insight into the properties of the material under test.

One of the challenges addressed in this invention is ensuring that the sound signal is determined primarily by the vibrations of the masonry sample when it is stimulated. Vibrations of the apparatus used for sample stimulation and of the apparatus used to support the sample will lead to confounding signals recorded in the air-borne sound. Moreover, assumptions about the size and shape of the specimen can be invalidated if the supporting apparatus is physically coupled to the specimen in a manner that significantly affects or constrains the natural free vibration of the specimen. An example of how these factors can be controlled is shown in FIG. 2, where a masonry unit (either a concrete cylinder or a concrete block) is placed on top of two wires to facilitate relatively free vibration of the specimen and to isolate the sample mechanically from the environment. Here a steel frame is used on which the two, adjustable, wire supports are mounted. While this embodiment is currently employed, the masonry unit can also be supported by foam insulation or rubber padding, etc., which are equally able to perform this support and isolation function.

The acoustic stimulation is accomplished by delivering a short duration, mechanical impulse by striking the sample under test with either a ball bearing or a spring-loaded striker. While a hammer would seem to be an attractive alternative, the vibrations of the hammer itself often create sound that interferes with the signal produced by the struck sample. The mass of the hammer also tends to result in a longer duration stimulus that suppresses the excitation of the higher frequency oscillation modes of the sample.

One embodiment of the spring-loaded striker can be fashioned from a pen-sized hand-held flare apparatus that is commonly carried by hikers and people working outdoors in areas were attacks by large animals such as bears are a risk. These devices have a small cylindrical metal firing pin that moves within a metal sleeve. You slide the firing pin back to depress a spring that is positioned inside the sleeve behind the pin. When the pin is released, the spring propels it forward. The striker for this embodiment was created by dismantling the flare apparatus and turning around the firing pin so that a blunt end is impacting the specimen. For best results, the striking element, i.e., the firing pin, should move clear of the spring and be moving freely under its own momentum within the sleeve at the instant that it impacts the specimen. This allows the striking element to bounce back quickly after the strike and remain out-of-contact with the specimen.

The impulse causes the masonry unit to vibrate in some combination of its normal vibration modes. For example, for a cylinder it will excite a combination of a longitudinal mode, a torsional mode, and a transverse mode. The sound generated by this impulse is recorded with a microphone (Blue Yeti Studio USB microphone, 16 bit, 48 kHz sampling rate) attached to a digital computer. The sound is digitized using an open-source, cross-platform software package (Audacity). Spectrum analysis based on Fast Fourier Transformation (FFT) is used to derive an estimate of the spectrum of the signal. The 48 kHz sampling rate sets a theoretical upper limit of 24 kHz for the frequency detection. The recorded signal is prepared for FFT analysis by zero padding the beginning and end of the impulse response to ensure the number of data points is a power of 2. The data processing is performed by custom-written Python code (Python 2.7), relying on open-source software from the Python scipy.fftpack module. Frequency components that are below 400 Hz or above 20 kHz are ignored because they are either unreliable or prone to being corrupted by ambient or instrumental noise.

Figure 4:
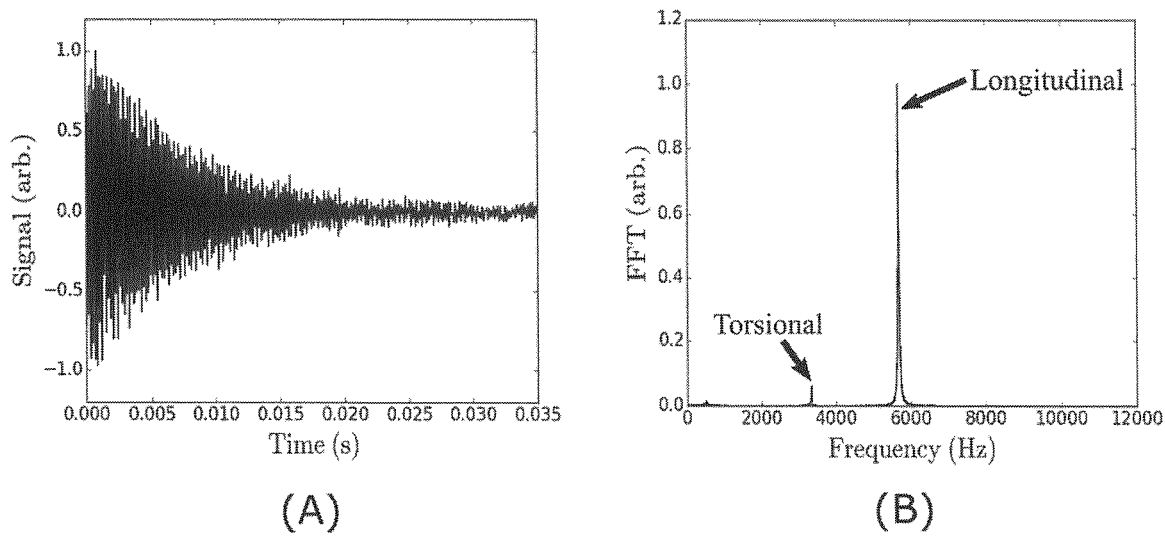
FIG. 4 is the plot of the air-borne acoustic signal from a concrete cylinder (A), and the FFT of this signal (B). The FFT of this signal is dominated by the longitudinal mode frequency (5671 Hz), with a small contribution from the torsional mode (3448 Hz).

An example of the acoustic signal from a concrete cylinder (30 cm length, 15 cm diameter) and its FFT is shown in FIG. 4. This sample was struck at the center of one flat end which most efficiently couples the input impulse into the longitudinal mode of vibration of the cylindrical specimen. The frequency spectrum derived from the FFT shows clear evidence of a dominant higher frequency longitudinal resonance and a much smaller contribution from the lower frequency torsional mode.

Figure 5:
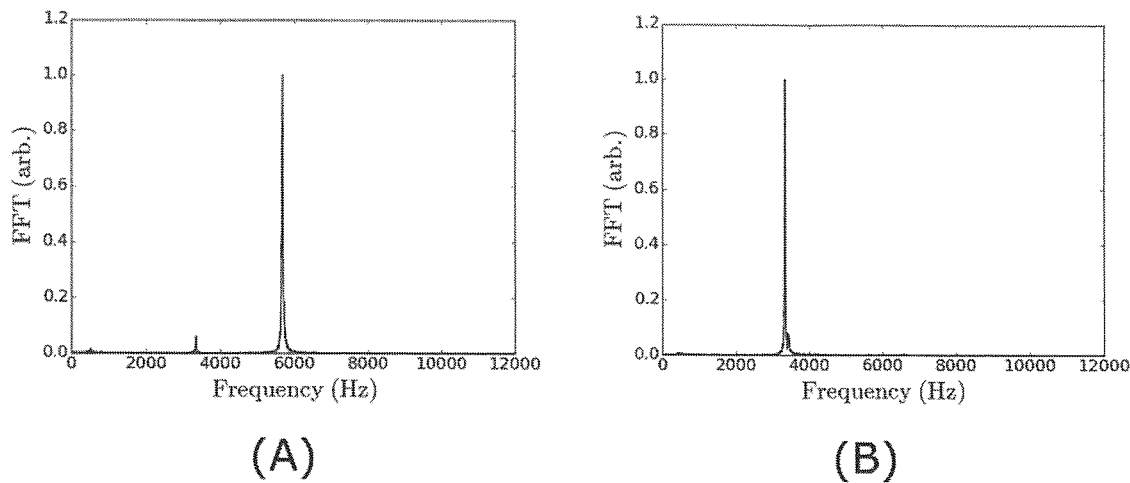
FIG. 5 is the FFT of the air-borne acoustic signal from the same sample being struck at different locations. (A) is the result of striking the flat end face of the cylinder producing a longitudinal vibration, while (B) was generated by striking the side of the cylinder, resulting in a torsional/transverse oscillation.

The strike location is important. The mechanical impulse delivered to the sample will induce oscillations in different normal modes of vibration, depending on where the impulse strikes the sample. As illustrated above, striking a cylindrical sample in the middle of an end face will preferentially excite longitudinal mode oscillations. By contrast, striking the cylinder on the side will couple energy preferentially into the torsional and transverse modes of oscillation. FIG. 5 shows this variation. Thus, a standard strike location is specified for each shape of masonry unit to be tested. This insures that the same mode(s) of oscillation will be interrogated from sample to sample and avoids misleading outcomes due to comparisons of different modes.

Figure 6:
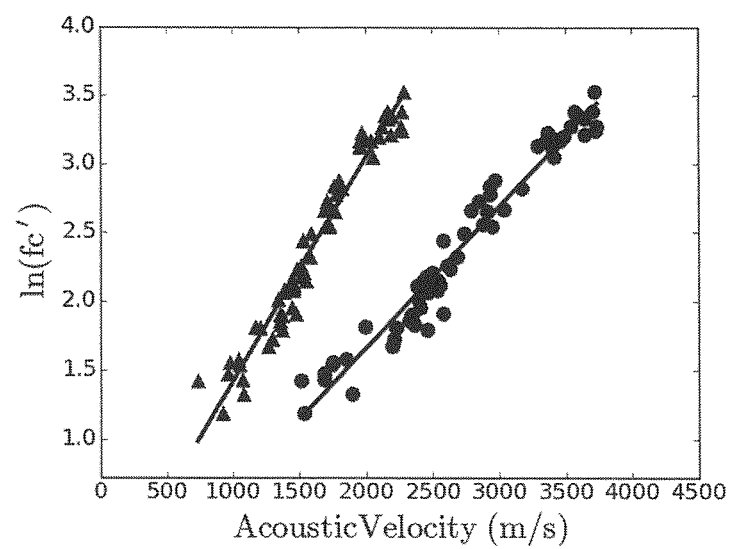
FIG. 6 is the plot of the natural log of the compressive strength $\ln(f_c')$ as a function of the acoustic velocity of the resonant mode of vibration in concrete cylindrical samples. The triangles are the results for the torsional mode while the circles are the longitudinal mode data.

This acoustic testing procedure was performed on over 60 concrete cylinders, fabricated in the Civil Engineering department at BCIT. The composition of the concrete was varied for each sample in order to obtain a range of compressive strengths. Subsequent to the acoustic testing, the samples were destructively tested to determine their compressive strength, $f_c'$, using a standard masonry testing machine, a Test Mark TM-6000-DB. This destructive testing revealed that the compressive strengths ranged from 3 MPa to 30 MPa. The acoustic velocities for the longitudinal and torsional modes of vibration observed for the cylindrical test samples were deduced from measured resonant frequencies and Eq. (3). These velocities were compared to the measured compressive strengths. A strong correlation between the natural log of the compressive strength (ln $f_c'$) and the velocities was found. The results are shown in FIG. 6. We find, $$\ln f_c' = -0.40(8) + 0.00103(3) \cdot [2Lf_{long}] \quad (4)$$

for the longitudinal mode of vibration, and $$\ln f_c' = -0.20(7) + 0.00162(4) \cdot [2Lf_{tor}] \quad (5)$$

for the torsional mode.

The choice to linearize the plot simplifies the analysis and allows us to apply straightforward regression analysis to the data set. For these data the Pearson r-squared correlation coefficient was 0.95. That is, 95% of the variation in ln $f_c'$ was explained by the variation in the measured acoustic velocities.

The slope values (0.00103) and (0.00162) for the longitudinal and torsional modes of vibration, respectively, differ. This is a consequence of Equation (1) which states that the longitudinal mode wave speed is proportional to the square root of the elastic modulus of the material, while the torsional (and transverse mode) is proportional to the square root of the (smaller) shear modulus. If these constants (or one of these and the Poisson's ratio) are known for the samples being tested, then the speeds of the different modes can be related to each other following the standard analysis of elastic constants for isotropic materials [16]. The metadata set analysis would improve the correlation performance but significantly increases the complexity of the masonry calibration methodology. Depending on the application, this additional complexity may not be worth the effort, given the strong correlations that have obtained using the simpler approach.

The fit constants extracted will depend on the material used to create the masonry, the masonry unit shape, and the mode of oscillation. Thus, user-specific masonry unit compositions and shapes can be calibrated by specifying the strike location and following the calibration procedure above. Note that Equations (4) and (5) can be re-expressed in terms of the measured acoustic frequencies provided the shape (length in this case) is fixed from sample to sample. That is, absorbing the (constant) 2L shape factor into the slopes, one has, $$\ln f_c' = -0.40(8) + 0.00618(18) \cdot [f_{long}] \quad (6)$$

and $$\ln f_c' = -0.20(7) + 0.00972(24) \cdot [f_{tor}] \quad (7)$$

for the longitudinal and torsional modes of oscillation, respectively. That is, for a fixed shape, there is a strong correlation between compressive strength and acoustic frequency measured from the air-borne signal.

Extension to Use on Isolated Blocks.

The results described above for cylinders provide convincing evidence to support use of the invention in testing of masonry elements with more complex shapes. A strong correlation between the frequency of resonant modes and compressive strength has been demonstrated for cylinders, and the justification for the correlation has been traced back to the material properties of the cylinder, combined with the size. A more complex shape, such as the masonry blocks that are commonly used in building construction, should also demonstrate the same type of behaviour. That is, given knowledge of the size and shape of the concrete block, the resonances stimulated by impulsive stimulation of the block can be used to estimate the strength of the block.

For more complex shapes the precise relationship between frequency and strength may need to be somewhat more empirical. For cylinders one is able to take advantage of a physics-based analysis of resonant properties, but for blocks or other complex shapes a physics-based analytical approach may be exceedingly complicated. One alternative is make use of Finite Element Analysis methods to derive the relationships. A further alternative is suggested by Equations (6) and (7): For a fixed size and shape of masonry unit, one would expect that, since the dimensions are not changing, the relationship can be expressed as, $$\ln f_c' = a + b \cdot [f] \quad (8)$$

The parameters a and b can be calibrated following the procedure described for cylinders. This approach is a purely empirical one that does not rely on analytical methods to separate extrinsic (shape) factors from the intrinsic ones (intrinsic material properties are carried in the acoustic frequencies). The parameter, b, contains geometric shape information about the masonry unit. Provided the shape is constant, b, will be a valid constant for strength determination. The advantage of this empirical approach is its simplicity of implementation. While less flexible than a full physics-based analysis or a Finite Element Analysis technique, it can be applied by anyone wanting to use the non-destructive, acoustic testing procedure presented here. One drawback will be that one would expect to see slightly lower correlation between measured resonant frequencies and compressive strengths due to variations in the sample sizes from one masonry unit to the next, not directly compensated for in calibration equation (8). This is a minor drawback for typical commercial masonry elements that demonstrate little size variation.

Example of Empirical Calibration for Testing of Concrete Blocks.

Figure 7:
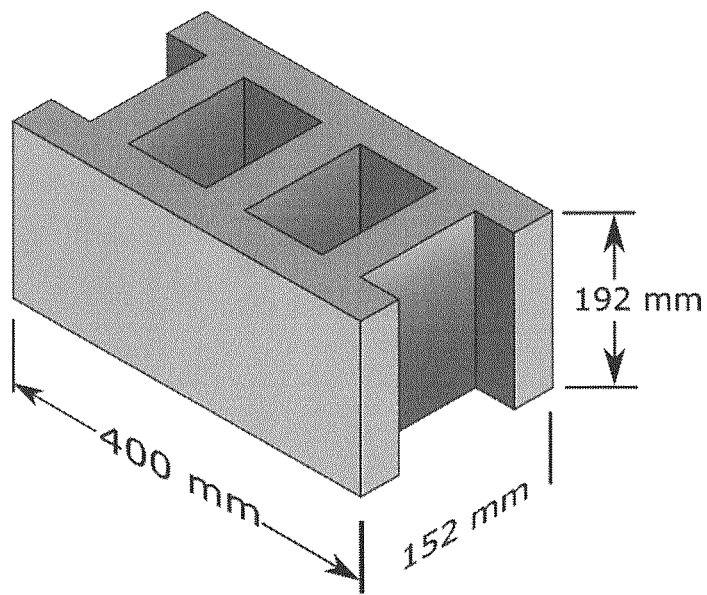
FIG. 7 contains the concrete block dimensions for the test samples fabricated at BCIT.

As noted for cylinders, the location of the stimulation is important, and with a complex shape there will be more modes of oscillation. While the presence of multiple modes in the impulse response signal can be accommodated by a more complex equation relating strength to frequency, one can simplify the solution by choosing a stimulation location that preferentially excites very few modes. For the greatest simplicity, it is desirable to strike the masonry unit at a location that produces only one or few dominant modes of vibration. Using a standard shape and a standard strike location facilitates the implementation of the empirical calibration method described in the previous section. As a validation of this approach, the testing procedure was applied to 2-cell, concrete blocks fabricated at BCIT with the dimensions indicated in FIG. 7. To identify the optimal strike location, a single specimen was stimulated with a spring-loaded striker at 10 different locations, illustrated in FIG. 8. The air-borne signals from each location were recorded and the resonant frequencies extracted using FFT analysis. The spectra, shown in FIG. 9, demonstrate the complexity of the acoustic modes of vibration observed, reflecting the complex shape of the masonry unit. From these data, strike location 5, along the center web from the face shell side, proved to have a single, strong mode of oscillation. The other strike locations along the center web (locations 7 and 8) also proved to have simpler FFT spectra compared to the other strike positions. Thus, these were adopted as the optimal test locations for this calibration demonstration. For other shapes of masonry unit, a similar survey can be performed to identify the optimal strike location.

Figure 10:
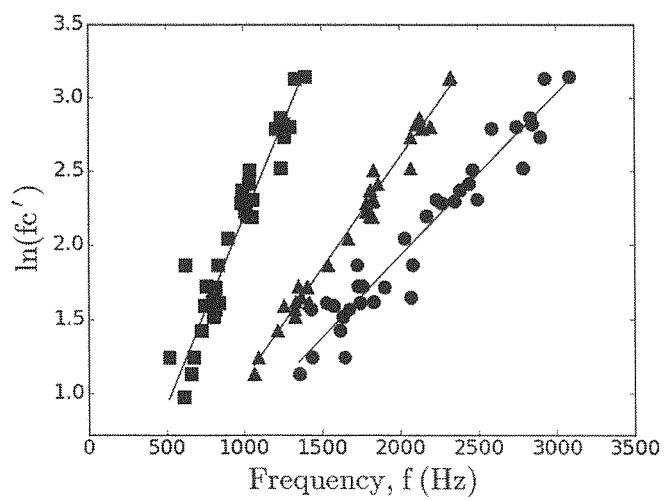
FIG. 10 is the plot of the $\ln f_c'$ as a function of the resonant frequencies extracted from the acoustic signals generated by the concrete blocks. The black squares are the results from location 5, the black triangles are from location 7, and the black circles from location 8.

A total of 31 concrete blocks were tested following the procedure described in the cylinder section of this document. The dominant frequency peak from the FFT analysis for block strikes at locations 5, 7, and 8—all located along the central web of the samples—were compared to their measured compressive strengths. For this sample set, the compressive strengths ranged, once again, from 3 MPa to 30 MPa. In accordance with Equation (8), the natural logs of the compressive strengths were plotted as a function of the dominant resonant frequencies for each of the three strike locations. As shown in FIG. 10, there is a strong correlation between $\ln f_c'$ and the frequencies, f, in agreement with our expectation.

A regression analysis for the data presented in FIG. 10 yielded the fitting results listed in the following Table. Just as for the concrete cylinders, the block results support the exponential relationship between compressive strength and the measured acoustic frequencies. The correlation extracted for these data is a comparable in performance to the cylinder findings. A slightly worse correlation is expected since there was no attempt to relate the measured frequencies to the acoustic wave velocities. Thus, the variation in dimensions from one sample to the next is not compensated for in this approach. The dependence of the slope on the oscillation mode agrees with the hypothesis that the speed of the acoustic wave is given by Eq. (1) and (3). For each different mode, the acoustic speed of the wave will depend on different intrinsic factors such as the elastic modulus or the shear modulus, the Poisson's ratio for the material, as well as the relevant dimension, L, involved in the oscillation mode.

| Strike Location | Fit Parameters | Pearson r-squared coefficient |
| --- | --- | --- |
| 5 | $\ln f_c' = -0.36(7) + 0.00254(7)f$ | 0.93 |
| 7 | $\ln f_c' = -0.41(4) + 0.00150(2)f$ | 0.98 |
| 8 | $\ln f_c' = -0.28(7) + 0.00110(3)f$ | 0.94 |

Figure 8:
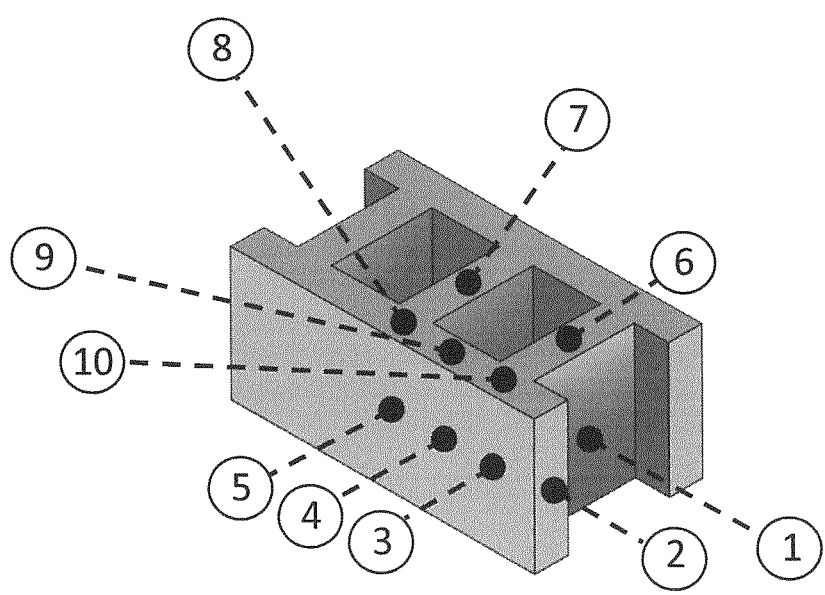
FIG. 8 contains the Strike locations used for acoustic testing of concrete blocks. Each location was given a mechanical impulse as described in the text, the resulting air-borne sound was recorded, and a FFT performed to extract the frequency components.
Figure 9:
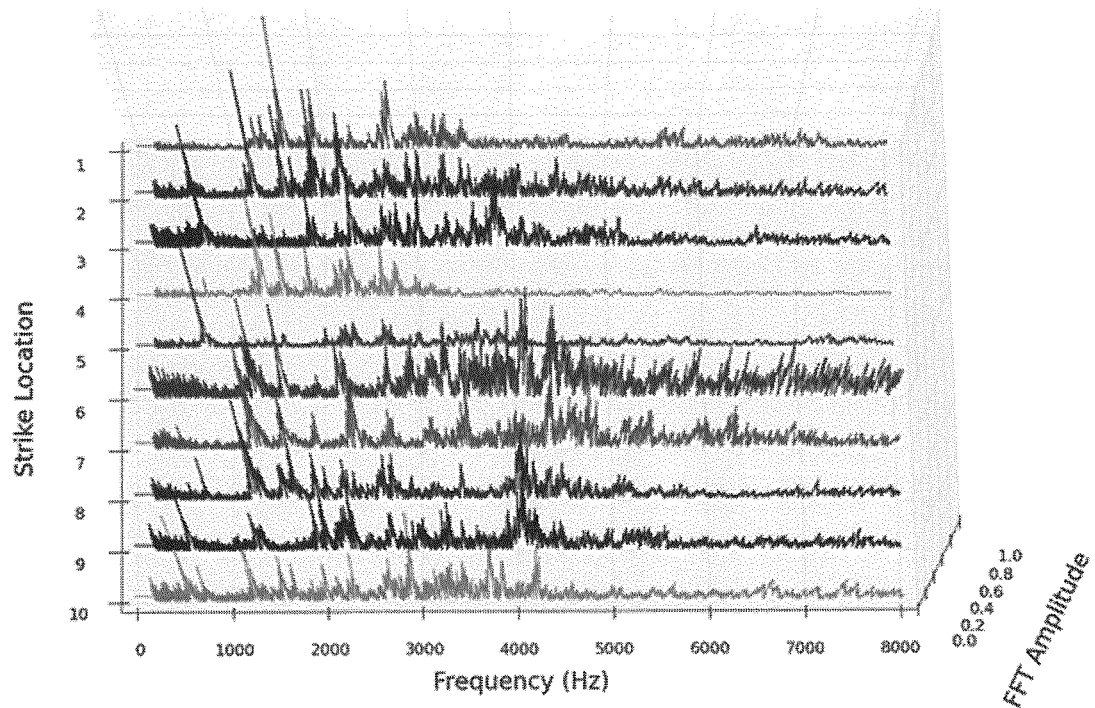
FIG. 9 contains the plots of the FFT spectra derived from the acoustic signals recorded by striking a single concrete block at the 10 different locations shown in FIG. 8. Note that location 5 (circled), corresponding to a strike along the center web of the block from the face shell side, produced the simplest acoustic spectrum, dominated by a single, low-frequency mode of oscillation.

In the above Table, the linear regression fit parameters are listed corresponding to the correlation between the measured compressive strengths of concrete blocks (In $f_c'$) and the dominant acoustic frequencies detected from impulse strikes at block locations 5, 7, and 8 (See FIG. 8). The Pearson r-squared coefficients demonstrate a strong correlation between the two parameters, once again.

The data analysis is not limited to this simple approach of examining a single mode of oscillation. The strength of correlation and the confidence of the predictions can be improved by performing a multi-mode analysis which incorporates the data from different oscillation modes to create a more robust predictor of compressive strength. Availability of multiple modes can also be used to help confirm that the samples was in fact struck in the correct location. Combined with a finite element analysis of the modes of vibration of the masonry unit, the different modes can be identified, and matched to the measured resonances. This approach would facilitate the analysis of signals from different strike locations (either as isolated data sets or in combination) which yield richer acoustic information.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. An apparatus for non-destructive measurement of a masonry specimen having prescribed physical attributes, the apparatus comprising:
   a stimulator arranged to apply a non-destructive stimulus to the specimen that will elicit an acoustic response;
   a response sensor arranged to capture sonic signals from the acoustic response to said non-destructive stimulus and generate a response signal that is representative of the captured sonic signals;
   a signal processor operatively associated with the response sensor for receiving the response signal from the response sensor and being arranged to execute programming instructions stored thereon so as to:
   (i) analyse the response signal and quantify pertinent features of the response signal, and
   (ii) calculate a compressive strength of the specimen based upon said prescribed physical attributes and the pertinent features quantified by the signal processor.

2. The apparatus according to claim 1 wherein the signal processor quantifies the pertinent features of the response signal according to one or more prescribed vibrational modes and wherein the apparatus further comprises a specimen support arranged to support the specimen thereon so as to reduce interference with said one or more vibrational modes.

3. The apparatus according to claim 1 further comprising a specimen support arranged to support the specimen on a respective surface of the specimen support that does not unduly vibrate sympathetically with the specimen when the specimen is stimulated by the stimulator.

4. The apparatus according to claim 1 wherein the stimulator includes a striking element which is arranged to vibrate in response to the non-destructive stimulus to the specimen in a manner which can readily be distinguished from vibrations of said specimen itself.

5. The apparatus according to claim 1 wherein the stimulator includes a striking element which is supported so as to rebound in a substantially unrestricted manner from the specimen responsive to said non-destructive stimulus to the specimen.

6. The apparatus according to claim 1 further comprising a supporting structure for supporting the specimen relative to the stimulator such that the stimulator is arranged to elicit an acoustic response which includes a selected mode of vibration and wherein the quantified pertinent features correspond to the selected mode of vibration.

7. The apparatus according to claim 1 wherein the response sensor comprises a transducer arranged to be affixed to said specimen and which is arranged to generate the response signal responsive to vibrations of said specimen in the audible frequency range.

8. The apparatus according to claim 1 wherein the response sensor comprises a transducer which is arranged to generate the response signal responsive to airborne sonic signals in the audible frequency range.

9. The apparatus according to claim 1 wherein the signal processor is further arranged to execute a spectrum analysis on the response signal followed by a derivation of attributes of one or more vibrational modes in the response signal.

10. The apparatus according to claim 1 wherein the signal processor is further arranged to execute a Wavelet analysis on the response signal followed by a derivation of attributes of any dominant Wavelets in the response signal.

11. The apparatus according to claim 1 wherein the signal processor is further arranged to compensate for interfering effects of said apparatus on said response signal resulting from supporting elements which support the specimen or coincidental vibrations of a striker element of the stimulator.

12. The apparatus according to claim 1 wherein the signal processor is further arranged to compare the response signal to validation criteria and determine if the response signal is consistent with a valid test.

13. The apparatus according to claim 1 wherein the pertinent features quantified by the signal processor include quantifications of selected time-domain attributes of the response signal.

14. The apparatus according to claim 13 wherein said quantifications of the selected time-domain attributes of the response signal are magnitudes and/or durations of said response signal.

15. The apparatus according to claim 1 wherein the pertinent features quantified by the signal processor include quantifications of selected properties of computed frequency spectra of the response signal.

16. The apparatus according to claim 15 wherein the selected properties are estimates of the frequency or bandwidth of one or more resonant peaks in said frequency spectrum.

17. A method for non-destructively measuring a masonry specimen having prescribed physical attributes, comprising:
   applying a non-destructive stimulus to said specimen to elicit an acoustic response;
   generating a response signal that is representative of the acoustic response to said stimulus by capturing sonic signals;
   analysing the generated response signal to quantify pertinent features of the response signal; and
   calculating a compressive strength of the specimen based upon the prescribed physical attributes of the specimen and the quantified pertinent features of the response signal.

* * * * *